United States Patent [19]

Yokoyama et al.

[11] Patent Number: 4,736,435

[45] Date of Patent: Apr. 5, 1988

[54] EAR PIECE TRANSDUCER

[75] Inventors: Yoshihiro Yokoyama, Yokohama; Shingo Watanabe, Tokyo; Koji Nageno, Tokyo, all of Japan

[73] Assignee: Sony Corporation, Tokyo, Japan

[21] Appl. No.: 765,181

[22] PCT Filed: Oct. 27, 1981

[86] PCT No.: PCT/JP81/00299

§ 371 Date: Jun. 30, 1982

§ 102(e) Date: Jun. 30, 1982

[87] PCT Pub. No.: WO82/01636

PCT Pub. Date: May 13, 1982

Related U.S. Application Data

[63] Continuation of Ser. No. 394,930, Jun. 30, 1982, abandoned.

[30] Foreign Application Priority Data

Oct. 31, 1980 [JP] Japan ................................ 55-152206
Oct. 31, 1980 [JP] Japan ................................ 55-152207

[51] Int. Cl.[4] ................................................ H04M 1/05
[52] U.S. Cl. ...................................... 381/187; 381/188
[58] Field of Search .................... 179/182 R, 179, 184, 179/156 R, 156 A, 107 R, 107 E; 181/129, 132, 135; 381/187, 182, 183, 188

[56] References Cited

U.S. PATENT DOCUMENTS

| | | | |
|---|---|---|---|
| 1,601,063 | 9/1926 | Frederick | 381/187 |
| 2,203,105 | 6/1940 | Roberts | 264/222 |
| 2,964,596 | 12/1960 | Christensen | 381/68.2 |
| 3,586,794 | 6/1971 | Michaelis | 381/158 |
| 3,821,647 | 6/1974 | Minasian | 381/187 |
| 4,133,984 | 1/1979 | Akiyama | 381/68.6 |
| 4,403,120 | 9/1983 | Yoshimi | 381/187 |
| 4,429,194 | 1/1984 | Kamon et al. | 381/187 |
| 4,588,867 | 5/1986 | Konomi | 381/187 |

FOREIGN PATENT DOCUMENTS 2082020 2/1982 United Kingdom ............ 179/156 R

OTHER PUBLICATIONS

Transit-Ear Hearing Aid by the Maico Co., filed Mar. 8, 1954

*Primary Examiner*—Jin F. Ng
*Assistant Examiner*—Danita R. Byrd
*Attorney, Agent, or Firm*—Hill, Van Santen, Steadman & Simpson

[57] ABSTRACT

This invention relates to a compact electro-acoustic transducer (10) to be used in the ear hole which prevents oppressive and inharmonious sensations to the auricle (A) when used and also prevents the deterioration of the reproduced sound quality. To do this, according to this invention, the electro-acoustic transducer (10) is formed of an outer casing (30) which houses therein an electro-acoustic transducer element (20), is shaped in size to be engagable with the concave portion of the auricle (A) and supported at least two points by one part of the auricle (A) when engaged with the concave portion of the auricle (A) and of a cord supporting member (50) extended from the outer casing (30) to be contact with the outer surface of the auricle (A) at a lower position than the respective supportion positions of the outer casing (30).

5 Claims, 3 Drawing Sheets

EAR PIECE TRANSDUCER

This is a continuation of application Ser. No. 394,930, filed June 30, 1982 and now abandoned.

TECHNICAL FIELD

This invention generally relates to an electro-acoustic transducer and is more particularly directed to a compact electro-acoustic transducer which is adapted to engage and attach a cavum concha of a concave portion in an auricle upon operation, we call it, the auricle insertion system.

BACKGROUND ART

An earphone or headphone is well-known in the prior art as an electro-acoustic transducer which offers simplicity, compactness and portability.

The earphone has such a construction that a molded case secures within it a small electro-acoustic transducer element of an electromagnet type provided with a pipe protrusively mounted on one end surface thereof and providing a sound path. Upon wearing, the earphone thus constructed is so attached as to insert or engage the pipe with an external auditory meatus. Although such earphone is very compact and convenient, the tone quality thereof is not completely satisfactory due to employment of the electromagnet arrangement. In addition, since the pipe is adapted to be inserted into the external auditory meatus, pressure upon wearing inevitably occurs and depending upon the depth the foregoing pipe is inserted into the external auditory meatus, the user feels a pain or an abnormality in the external auditory meatus. Furthermore, it is unavoidable that reproduced tone quality will be deteriorated.

To remove these drawbacks of such prior earphones, an improved earphone has been proposed. Utilizing a dynamic speaker unit and installing a pad on one side of a case to house the above unit as well as an elastic bow on one end of an external periphery of the case, upon operation, the pad is securedly pressed or attached to an outside of the auricle and the bow is caught in an external periphery of the auricle. However, the earphone of this type can not be stably worn and moreover, the reproduced tone quality may be deteriorated by the position in which the earphone is attached to the auricle.

On the other hand, such a headphone is widely used by providing a pair of housings on both ends of an elastic headband and securing the dynamic or static speaker and so on within the housings. Each housing is securedly pressed or attached to the auricles by utilizing the elasticity of the head band. Even in the headphone thus discussed, the elasticity of the head band causes a pressure on the head, and a discomfort upon wearing can not be avoided. Further, in wearing by a woman, she is liable to refuse the use of the headphone specifically because she is afraid that her hair style may be broken.

DISCLOSURE OF INVENTION

Hence, a main object of this invention is to provide an electro-acoustic transducer which can eliminate the afore-described defects.

Another object of this invention is to provide an electro-acoustic transducer which can prevent an occurrence of discomfort upon wearing and can be stably attached.

Still another object of this invention is to provide an electro-acoustic transducer which is simple in construction and can be easily manufactured or worked.

A further object of this invention is to provide an electro-acoustic transducer which can prevent a deterioration of a sound characteristic such as a reproduced tone quality.

Still a further object of this invention is to provide an electro-acoustic transducer which positively, reliably prevents deposition of earwax, iron powder, dust and so forth from entering into a casing from the outside thereof, thereby to protect a diaphragm or the like of the electro-acoustic transducer element.

In order to perform solutions, in accordance with this invention, an electro-acoustic transducer is formed of an outer casing engaging with the concave portion of an auricle and a cord supporting member extended from the outer casing, such that the electro-acoustic transducer can be attached to and held at a part of the auricle by the outer casing and the cord supporting member without pressing the auricle.

BEST MODE FOR CARRYING OUT THE INVENTION

Figure 1:
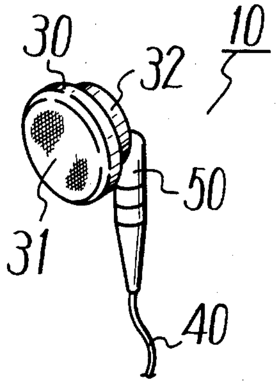
FIG. 1 is a perspective view of one embodiment of an electro-acoustic transducer according to this invention.
Figure 2:
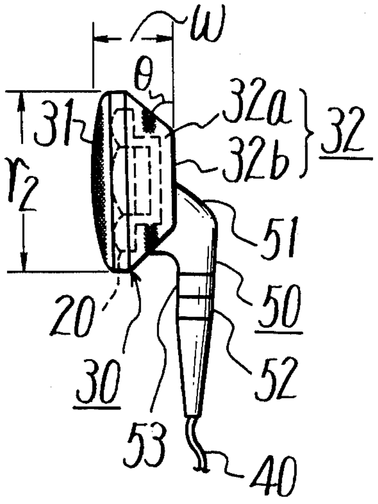
FIG. 2 is a side view of the electro-acoustic transducer illustrated in FIG. 1.

As seen in FIGS. 1 and 2, an electro-acoustic transducer 10 according to this invention is provided with an outer casing 30 to secure within it an electro-acoustic transducer element 20 composed of a diaphragm, a magnetic circuit and so on and a cord supporting member 50 elongated from the outer casing 30 to support an external connection cord 40 led from the afore-described electro-acoustic transducer element 20 which will be described later.

Figure 3:
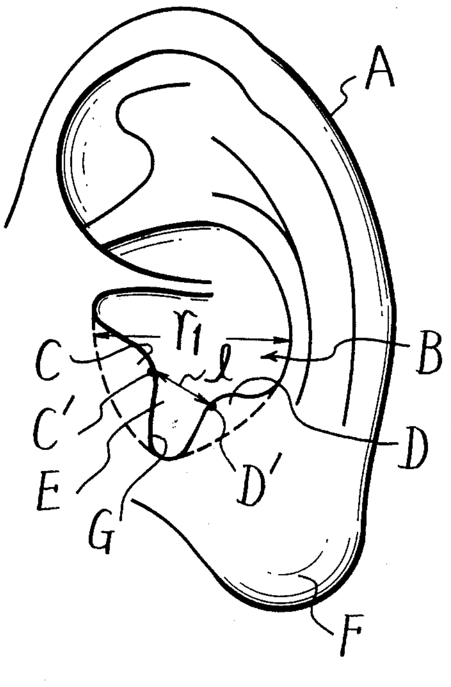
FIG. 3 is a front view of an auricle useful for explaining the invention.
Figure 4:
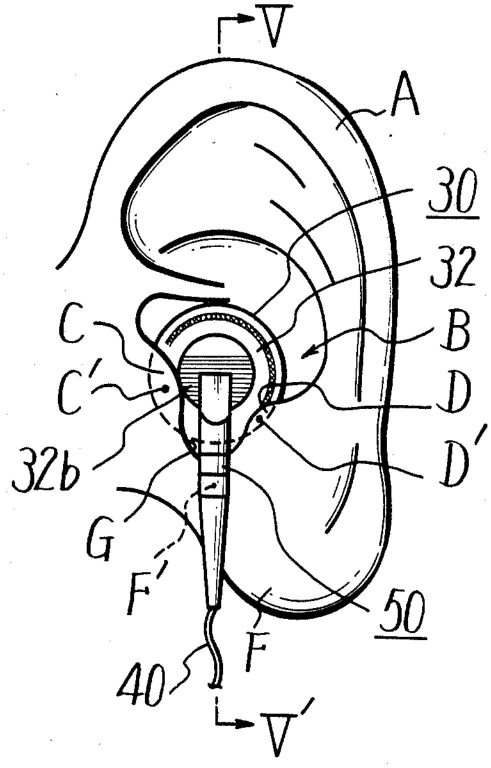
FIG. 4 is a rear view of the electro-acoustic transducer illustrated in FIG. 1 under the condition adapted to attach the auricle.

As shown in FIGS. 3 and 4, the outer casing 30 is formed in an appropriate size so as to be engaged with a cavum concha B which is a concave portion of an auricle A and is further constructed in such a fashion that when engaged with the cavum concha B, at least two points of an external surface of the outer casing 30 can be supported by a tragus C and an antitragus D each composing one portion of the auricle A.

If specific sizes of each portion in the cavum concha B of man's auricle A with which the outer casing 30 is detachably engaged are represented with reference to FIG. 3, a diameter $r_1$ of the cavum concha B mentioned above is in a range of about 10 mm to 20 mm, a distance l covering an area from a tip C′ of the tragus C to a tip D′ of the antitragus D, each of which is oppositely projected against the cavum concha B and is in a range of 4 mm to 12 mm and a depth of the cavum concha B in the vicinity of the tip C′ of the tragus C is in the range of 7 mm to 14 mm. Further, a portion across a bottom portion of the cavum concha B, the tragus C and the antitragus D forms a curved rising-up surface E.

Then, the outer casing 30, which is to be engaged with the cavum concha B having sizes and shapes aforementioned as shown in FIG. 2 is substantially formed of a circular truncated cone in which a diameter $r_2$ thereof is in a range of about 14 mm to 18 mm and a width w thereof is in a range of about 5.5 mm to 7.5 mm, and composed of a front portion 31 corresponding to a bottom surface thereof and a back portion 32 corresponding to a remaining surface thereof. The back portion 32 made up of an inclined surface **32*a* corresponding to a side surface and a rear surface 32*b* corresponding to an upper surface. The front portion 31 is formed of a dome shape so as to substantially close the entrance of the external auditory meatus. The inclined surface 32*a* is constructed in such a manner that a rear periphery portion thereof facing externally to the auricle A when engaged with the cavum concha B may be tapered and an inclined angle $\theta$ thereof is selected so as to nearly coincide with the curved rising-up surface E of the cavum concha B, for example, as approximately 35° relative to the rear surface 32*b***.

On the other hand, the cord supporting member 50 elongated from the outer casing 30 is mounted on the rear surface **32*b* of the outer casing 30 through a base portion 51 bended approximately as an L-shape in which an elongated portion 52 nearly cylindrically constructed to vertically guide the external connection cord 40 downward is extendably formed from the outer casing 30 in such a fashion that an inside surface 53 of the elongated portion may become substantially parallel with and on one surface of the rear surface 32*b* of the outer casing 30**.

Figure 5:
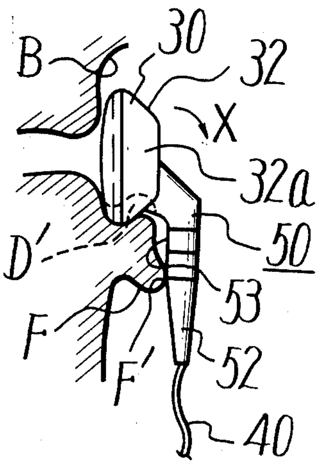
FIG. 5 is a partial cross-sectional view taken along a V—V' in FIG. 4.

When the outer casing 30 is engaged with the cavum concha B, as shown in FIGS. 3 to 5, the cord supporting member 50 is faced to a recess G between the tragus C and the antitragus D and is protrusively elongated to an underside of the auricle A so that the inside surface 53 of the elongated porton 52 is urged closely to contact with at least one point F′ lower than the tragus C and the antitragus D on an external surface of a lobe F.

Therefore, as shown in FIGS. 4 and 5, the electro-acoustic transducer 10 thus composed according to this invention is attachably engaged with the cavum concha B so as to hold one portion of the outer casing 30 by three points, two of which are the tip point C′ of the tragus C and the tip point D′ of the antitragus D to support the inclined surface **32*a* of the outer casing 30 and a remaining one exists on the inside surface 53 of the elongated portion 52 of the cord supporting member 50 to closely contact with at least one point F′ on the external surface of the lobe F. Since the above close contact point of the elongated portion 52 of the cord supporting member 50 relative to the lobe F is specifically positioned lower than those supporting points to support the outer casing 30, the afore-said close contact point functions to prevent the outer casing 30, which pivots on two supporting points of the tip point C′ of the tragus C and the tip point D′ of the antitragus D, from being rotatably moved in the direction of arrow X to cause a drop out of the outer casing 30 from the cavum concha B, shown in FIG. 5**. By such a construction employing three supporting points, it is apparent that the electro-acoustic transducer can be stably and positively attached or fastened to one portion of the auricle A without pressing the auditory opening.

Figure 6:
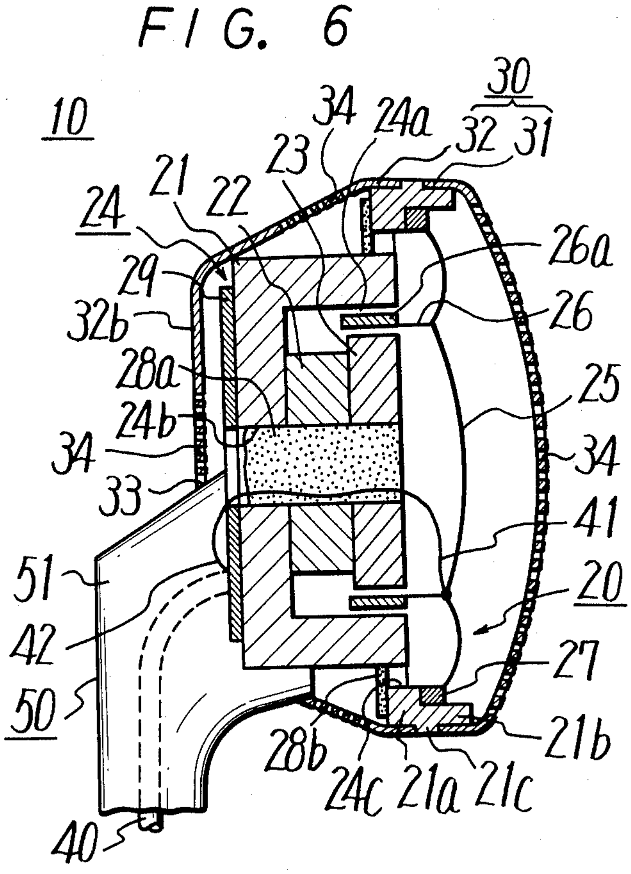
FIG. 6 is a cross-sectional view of the electro-acoustic transducer shown in FIG. 1.

Within the outer casing 30 of the electro-acoustic transducer 10 is housed, as seen in FIG. 6, the electro-acoustic transducer element 20.

The electro-acoustic transducer element 20 is provided with a yoke 21 formed of an oval C-shape cross-section, a magnet 22 disposed on a central portion of this yoke 21 and a top plate 23 placed on the magnet 22 which form a magnetic circuit 24. Between the yoke 21 and the top plate 23 is formed a magnetic gap **24*a* and around a voice coil bobbin 26 vertically attached to a central portion of a diaphragm 25 is wound with a voice coil 26*a*, which is inserted or placed into the magnetic gap 24*a*. To an inner peripheral surface of annular wall 21*b* formed of an upper portion of an external peripheral edge 21*a* of the yoke 21 is attached a peripheral edge of the diaphragm 25 through a diaphragm ring 27**.

Throughout the central portion of the magnetic circuit 24 is formed a through bore **24*b* so as to radiate a rear vibration of the diaphragm 25 to outside and at the peripheral edge portion 21*b* of the yoke 21 are also formed many through bores 24*c* along the circumference to radiate the rear vibration of the diaphragm 25 to the outside in each of through bores 24*b* and 24*c* are placed damping members 28*a* and 28*b***.

From the voice coil **26*a* is led out a lead wire 41 to the rear side of the magnetic circuit 24 via the through bore 24*b* formed in the magnetic circuit 24. At the rear side of the magnetic circuit 24 is attached a terminal plate 29 made of a synthetic resin to which the connection cord 40 and the lead wire 41 are connected via a terminal 42** secured at one portion of the terminal plate.

To house the electro-acoustic transducer element 20 in the outer casing 30, the edge face of the front portion 31 of the outer casing may be engaged with the external peripheral face of the wall **21*b* of the yoke 21. An insertion opening 33 is provided in the back 32 so that the cord supporting member 50 may be engaged with the outer face of the peripheral edge portion 21*a* of the yoke 21, thus urging the respective edge faces against to a protrusion 21*c* provided on the peripheral edge portion 21*a* of the yoke 21** to thereby restrict the engaging position.

In the electro-acoustic transducer 10 thus arranged, it is necessary to provide a number of through-openings 34 on the front portion 31 of the outer casing 30 opposing the diaphragm 25 in order to radiate a reproduced sound. If the electro-acoustic transducer is constructed as a so-called open-air type wherein the rear vibration caused from the rear of the diaphragm 25 is radiated to the outside of the outer casing 30, the through-openings 34 are also required to be provided on the back portion 32 of the outer casing 30.

However, in order to prevent earwax attaching upon wearing in the auricle, and to prevent iron powder, dust and so on attaching upon transportation entering into the outer casing and to thereby protect the diaphragm 25 and so forth of the electro-acoustic transducer element 20, it is desirable that the through-openings 34 provided on the above outer casing 30 may be small as possible and can not be enlarged larger than a predetermined size. However, with respect to a property of the electro-acoustic transducer, it must be avoided that the sound characteristic be deteriorated by the fact that only the fine through-openings 34 can be provided on the outer casing 30.

Figure 9:
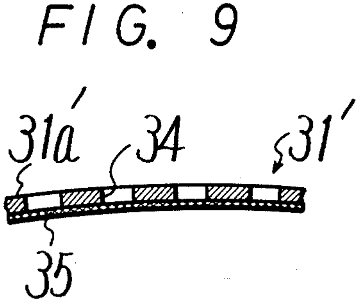
FIG. 9 is a cross-sectional view of a plate body to form the outer casing.

To cope with the above aspect, it may be considered that the outer casing 30 is formed by utilizing a plate member 31' having a construction as shown in FIG. 9. That is, the through-openings 34 to radiate a sound wave are bored into a plate member 31*a'* made of a thin metal and so on by a punch press or the like. Since it is extremely difficult to form the through-openings 34 small enough in size to prevent earwax and some other dusts from entering therethrough, a sheet member 35 of mesh type such as a cloth or the like is bonded to one side surface of the plate member 31*a'*. The outer casing 30 formed of the plate member 31' thus constructed can prevent the entering of the earwax and the dust as well as the deterioration of the sound characteristic.

However, the plate member 31' as seen in FIG. 9 must be further glued by the mesh type sheet member 35 after the through-openings 34 are bored so that the manufacturing process becomes complicated and the work thereof is quite difficult. To solve this problem, it is enough that the outer casing 30 is formed by an electroforming work or an etching work.

Figure 10:
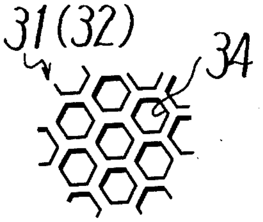
FIG. 10 is a magnified representation of microscopic openings formed through the outer casing.

When the front and back portions 31 and 32 are constructed, a negative mold (internal mold) corresponding to the front and back portions 31 and 32 wherein many fine or microscopic through-openings 34 of hexagon shape, each edge of which is, for example, nearly 0.2 mm long as shown in FIG. 10 are formed is previously prepared. After a metal such as a copper, a nickel, an iron and so forth is electrodeposited thereon by an electrolysis, the electro-deposited metal fractions are peeled off from the afore-described mold thereby to duplicate the same mold as the prototype with accuracy. Or, forming the prototypes of the same molds as the front and back portions 31 and 32, electroforming the prototypes so as to produce the negative molds and further electroforming these negative molds, the desired outer casing 30 intended to be the same as the above prototype may be duplicated.

Figure 7:
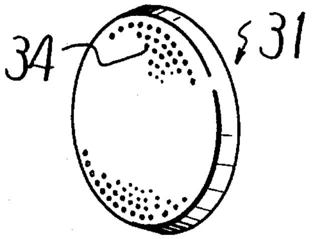
FIG. 7 is a perspective view of a front wall composing one portion of an outer casing of the electro-acoustic transducer.
Figure 8:
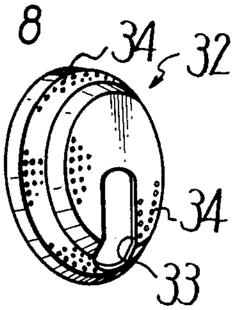
FIG. 8 is a like perspective view of a rear wall thereof.

It is also desirable that the microscopic-openings bored through the outer casing 30 are provided on a portion opposing to the diaphragm 25 with respect to the front portion 31 as shown in FIG. 7 while portions opposing the through openings 24*b* and 24*c* formed in the magnetic circuit 24 relative to the back portion 32 as shown in FIG. 8.

Since the outer casing 30 formed by such electroforming is constructed as a remarkably a thin plate member, the load to the reproduced sound radiated from the diaphragm 25 is small thereby making its acoustic impedance low.

If a work method or process is capable of forming the openings very small as same as the microscopic openings 34, it is also possible to form the outer casing by another work method or process such as by etching.

As described above, since the electro-acoustic transducer 10 according to this invention can be attached or worn without being pressed and inserted to the auditory opening like the conventional earphone, upon wearing, the user feels no pain or abnormality and can wear it without the discomfort on the head caused by the usual headphone. Further, since the auditory opening is not tightly closed, the reproduced tone quality is never deteriorated so that reproduced sound with remarkably good sound characteristic becomes audible. Further, due to the fact that the outer casing is formed of the plate member having low acoustic impedance wherein many microscopic openings are constructed by the methods of the electroforming or etching work, etc., without hindering the radiation of the sound wave from the diaphragm, at least one portion of the external periphery can serve to prevent the sound characteristic from being deteriorated as well, by earwax, iron powder and other dust from being entered into the outer casing.

By covering the external peripheral surface of the outer casing with the plate member in which many microscopic-openings were formed, its outer appearance can be formed by the metal mesh type so as to produce a novel design and when the above plate member is formed by the electroforming work or the like, the outer casing can be shaped so as to easily produce the intended appearance and can be freely designed.

In the afore-said embodiment of the invention, the cord supporting member 50 is elongated from the under side of the outer casing 30. However, if the point of the cord supporting member contact with at least one point of the external surface of the auricle A is positioned lower than the two points which support the outer casing 30, the cord supporting member can extend from another portion of the outer casing. Further, if the cord supporting member 50 is formed, for example, bifurcated so as to closely contact with two points or more on the external surface of the auricle A, a still more stable construction can be realized.

Although the outer casing 30 is formed of a circular shape, if necessary, it may be freely modified into an elipse shape or the like corresponding to any cavum concha B.

In the embodiment mentioned above, the open air type is described as an example. But, in other types, it may be enough that the microscopic openings are formed only on the front portion of the outer casing 30. Further, this invention is not limited to the earphone type to hear the audio reproduced sound but is also applicable to a microphone.

What is claimed is:

1. An electro-acoustic transducer for use in a human auricle having an external auditory meatus comprising an outer casing housing having within it an electro-acoustic transducer element and formed with a front surface of a diameter larger than the opening of the external auditory meatus and sufficient in size to engage with a concave portion of an auricle, and having a back surface having at least two points respectively supported by inwardly facing tragus and anti-tragus portions of the auricle when the casing is engaged with the concave portion of the auricle, and a cord supporting member substantially rigid with and extendably formed backwardly and downwardly from the back of said outer casing so as to contact with an external surface of said auricle at at least one point positioned lower than each inwardly facing portion contacting the back surface of said outer casing and supporting an external connection cord led from said electro-acoustic transducer element.

2. An electro-acoustic transducer according to claim 1, wherein the back surface of said outer casing is generally in the form of a circular truncated cone.

3. An electro-acoustic transducer according to claim 1, wherein at least the front surface portion of the outer casing is comprised of a plate member through which many fine openings are formed.

4. An electro-acoustic transducer according to claim 1, wherein at least the front surface portion of the outer casing is comprised of a plate member being formed to have many microscopic openings therethrough.

5. An electro-acoustic transducer according to claim 1, wherein said cord supporting member extends through a recess between the tragus and the antitragus and contacts the ear at a point below said tragus and antitragus.

* * * * *